(12) United States Patent
Lien et al.

(10) Patent No.: US 9,936,722 B2
(45) Date of Patent: Apr. 10, 2018

(54) SHELF-STABLE COOKING AID AND A PROCESS FOR ITS PREPARATION

(71) Applicant: Nestec S.A., Vevey (CH)

(72) Inventors: Wen Sze Lien, Singapore (SG); Zhu Gao, Gao (CN); Yong Fu Wang, Shanghai (CN); Beatrice Lado, Saint-Andre de Cubzac (FR); Yan Xi Jin, Shanghai (CN); Fabien Robert, Divonne les Bains (FR); Ahmed Bousbaine, Pully (CH); Nadji Rekhif, Singen (DE); Christopher Brimelow, Singapore (SG)

(73) Assignee: Nestec S.A., Vevey (CH)

( * ) Notice: Subject to any disclaimer, the term of this patent is extended or adjusted under 35 U.S.C. 154(b) by 144 days.

(21) Appl. No.: 14/573,684

(22) Filed: Dec. 17, 2014

(65) Prior Publication Data

US 2015/0104542 A1 Apr. 16, 2015

Related U.S. Application Data

(63) Continuation of application No. 11/574,377, filed as application No. PCT/EP2005/009242 on Aug. 26, 2005, now abandoned.

(30) Foreign Application Priority Data

Sep. 3, 2004 (WO) .................. PCT/EP04/09846

(51) Int. Cl.
*A23L 1/221* (2006.01)
*A23L 27/10* (2016.01)
(Continued)

(52) U.S. Cl.
CPC ............... *A23L 1/221* (2013.01); *A23L 23/10* (2016.08); *A23L 27/10* (2016.08);
(Continued)

(58) Field of Classification Search
CPC .......... A23L 1/221; A23L 1/2363; A23L 1/40; A23L 1/228; A23L 1/227; A23L 1/22642; A23L 1/2295; A23L 1/2364
See application file for complete search history.

(56) References Cited

U.S. PATENT DOCUMENTS 3,578,465 A 5/1971 Zijden
3,615,600 A * 10/1971 Tonsbeek .............. A23L 1/2295
426/535

(Continued)

FOREIGN PATENT DOCUMENTS

CH 507665 5/1971
CN 1178642 4/1998
(Continued)

OTHER PUBLICATIONS

Eldridge et al. "Carbohydrate Composition of Soybean Flours, Protein Concentrates, and Isolates" vol. 27 No. 4 1979 J. Agric. Food Chemistry pp. 799-802.*
Huisman "Cell Wall polysaccharides from soybean . . . " Carbohydrate Polymers vol. 37 1998 pp. 87-95.*
(Continued)

*Primary Examiner* — Felicia C Turner
(74) *Attorney, Agent, or Firm* — K&L Gates LLP

(57) ABSTRACT

The invention concerns a shelf-stable concentrate cooking aid comprising a reduced amount of natural MSG, IMP and GMP between 10 and 20% in weight of natural food derived acids and sugars and between 20 and 45% of naturally derived macromolecules.

17 Claims, 2 Drawing Sheets

Figure 1:
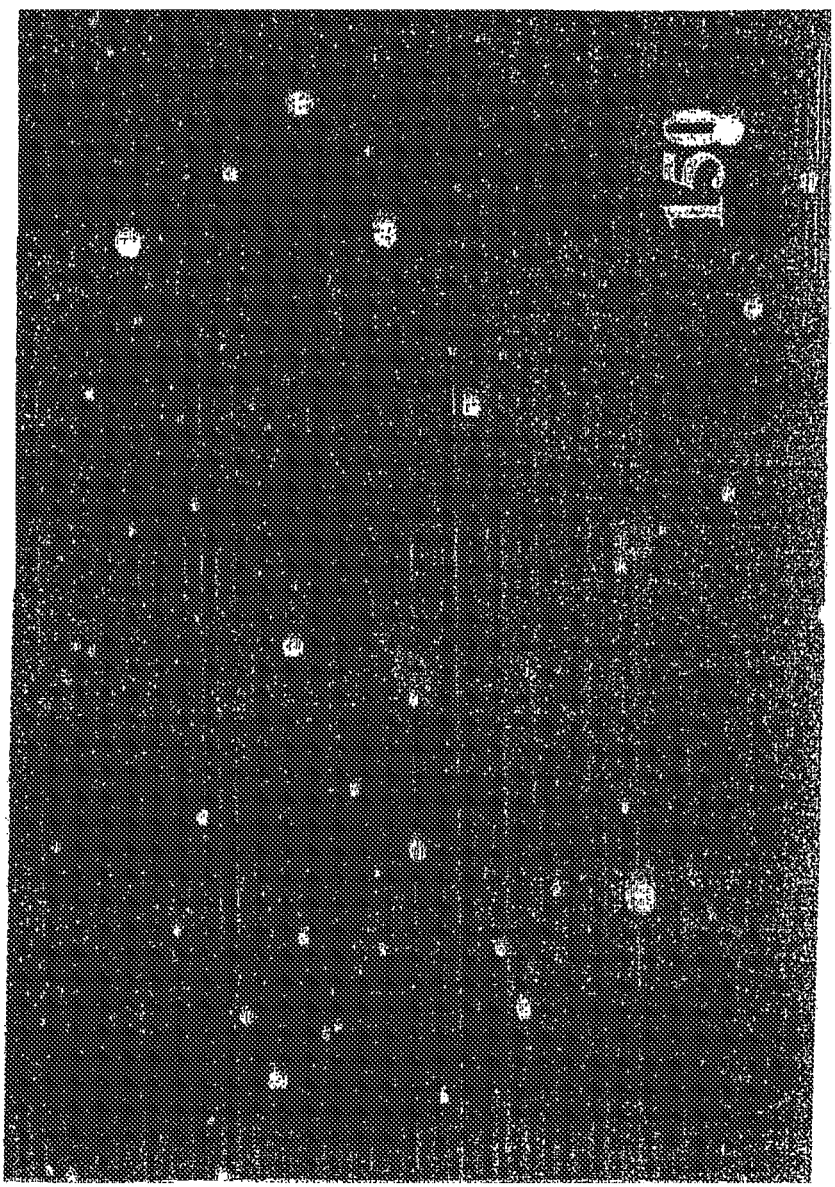

(51) Int. Cl.

| | |
|---|---|
| *A23L 27/20* | (2016.01) |
| *A23L 27/21* | (2016.01) |
| *A23L 27/22* | (2016.01) |
| *A23L 27/23* | (2016.01) |
| *A23L 27/30* | (2016.01) |
| *A23L 23/10* | (2016.01) |

(52) U.S. Cl.
CPC ........... *A23L 27/2028* (2016.08); *A23L 27/21* (2016.08); *A23L 27/22* (2016.08); *A23L 27/235* (2016.08); *A23L 27/33* (2016.08); *A23L 27/34* (2016.08); *A23V 2002/00* (2013.01)

(56) References Cited

U.S. PATENT DOCUMENTS

| | | | | |
|---|---|---|---|---|
| 4,165,391 A | | 8/1979 | Corbett | |
| 5,077,062 A | * | 12/1991 | Ernster | A23L 1/238 426/46 |
| 5,366,747 A | | 11/1994 | Buckholz | |
| 6,190,709 B1 | | 2/2001 | Schoenmaker | |
| 2004/0142090 A1 | * | 7/2004 | Goral | A23J 7/00 426/650 |

FOREIGN PATENT DOCUMENTS

| | | |
|---|---|---|
| EP | 0031162 | 7/1981 |
| EP | 1344459 | 9/2003 |
| JP | 10286076 | 10/1998 |
| KR | 20030021782 | 3/2003 |

OTHER PUBLICATIONS

Yoshida et al JAOCS 1992 vol. 69 No. 11 pp. 1136-1140.*
https://www.britannica.com/topic/meat-processing/Skeletal-muscle-contraction#toc50315 May 25, 2001.*
Gebhardt and Thomas "Nutritive Value of Food" 2002 USDA pp. 56-60.*
"10 Questions About Yeast Extract" European Association for Specialty Yeast Products, 9 pages.
Xiaofu et al. "Experiment on Developing New Bamboo Shoots Crisps" 4 pages.
Gunenc "Evaluation of Pork Meat Quality by Using Water Holding Capacity and Vis-Spectroscopy" Department of Bioresource Engineering Macdonald Campus, McGill University, Montreal, Quebec, Canada, Aug. 2007, 2 pages.
Kozukue et al. "Organic Acid, Sugar and Amino Acid Composition of Bamboo Shoots" Journal of Food Science, vol. 48, 1983, pp. 935-938.
Konuk et al. "Chemical Composition of Some Naturally Growing and Edible Mushrooms" Pak. J. Bot., 38(3), 2006, pp. 799-804.
Fish "A Method for the Quantitation of 5'-Mononucleotides in Foods and Food Ingredients" J. Agric. Food Chem., 1991, vol. 39, pp. 1098-1101.
Tseng et al. "Contents of Sugars, Free Amino Acids and Free 5'-Nucleotides in Mushrooms, Agaricus bisporus, During Post-Harvest Storage" J. Sci. Food Agric., vol. 79, 1999, pp. 1519-1523.
Patent Abstracts of Japan, JP Publication No. 10-286076, "Nucleic Acid-Based Seasoning Preparation Composition and its Production" 1 page.
Guion P: "Umami: a French stock in trade?" FSTA, 1997, XP002246741 abstract.

* cited by examiner

SHELF-STABLE COOKING AID AND A PROCESS FOR ITS PREPARATION

CROSS REFERENCE TO RELATED APPLICATIONS

The present application is a Continuation of U.S. application Ser. No. 11/574,377 filed on Mar. 27, 2007, which is a National Stage of International Application No. PCT/EP2005/09242, filed on Aug. 26, 2005, the entire contents of which are incorporated herein by reference.

The present invention concerns a shelf-stable cooking aid and a process for its preparation.

In traditional cuisine and cooking, high flavour and delicious stocks are widely used. Such stocks or bouillons may be fish, meat or vegetables based are serve as basis for simmered dishes, stews, sauces, soups and other premium quality and tastefully dishes. Alternatively they can be added in such dished for imparting and/or enhancing deliciousness.

High quality stocks and bouillons are prepared by chefs in restaurant and by meal preparers in the home according to traditional recipes. Such stocks are obtained after a long preparation that includes slicing, cooking, boiling and simmering of selected tasteful ingredients such as meat, vegetables, bones, spices etc . . . . Such a preparation is long and cumbersome and eventually, the thus obtained products are not shelf-stable and need to be used within a short time. This is however the only way for chefs and consumers to obtain high quality stocks and bouillons with full bodyness, good mouthfeel and high flavour impact.

Besides that, many flavour and taste enhancers have been developed and are available in the trade. The food industry has developed a wide variety of ready to use flavour enhancer for various culinary applications. These may be concentrated bouillons in form of paste, powder, compressed cubes or granulates. The wide range of culinary base whether in the form of powder or paste is usually obtained by the precise mixing of tasty ingredients such as salt, sugars, sodium glutamate, spices and selected flavours all along mixed with a carrier.

The addition of these culinary additives helps to provide deliciousness and taste appealing properties to the food product in which they are added. Indeed, all around the world, the deliciousness is definitively perceived as the key attributes of high quality meals. This deliciousness is a subjective attribute and is usually described using different wording in the different countries based on the cultural background and on the culinary and cooking habits. The deliciousness can however be described as the property of a meal that makes it appealing to the taste and odour thanks to different organoleptic properties such as fast flavor impact, blooming full bodied in mouth feel, lingering in taste while smooth in consistency and causing salivation. For example, according to asian preferences, the deliciousness and the attached organoleptic attributes have been described as the fith taste, so called Umami. Monosodium Glutamate (MSG) has been described, in combination with interacting components such as nucleotides and NaCl as the principal responsible for the Umami taste. However, Umami may be sometimes found as uncomplete and somehow too chemical and also uncomfortable in the mouth. Umami has mainly been described in Japan and Japanese cuisine. On the other hand, Chinese cuisine, one of the most complex cuisine in the world, also comprises a taste description of deliciousness. In Chinese cuisine as well in Chinese mindset, the expression Xian is the one that corresponds and describes to the best as deliciousness since it incorporates others dimensions as well as other sensory feelings compared to Umami. The so called Xian expression is well understood and commonly used in Chinese culinary culture but its objective description and characterization still remains unclear since it seems to go beyond the umami dimension.

Flavour enhancers are commonly used in culinary applications. These flavors enhancers are added or a part of culinary products such as soup, sauces and meals and make them more taste appealing by giving them the deliciousness required by the consumers. The deliciousness is a culinary meaning relating to the overall feeling of a food product. The taste and flavor enhancement is known in any region in the world, from west to east and correspond to roughly the same organoleptic profile, rich in taste, full of bodyness etc . . . .

Taste enhancers are currently associated with umami and/or Xian sensations in Asian cuisine. On the other hand, there is no direct expression for this notion of Xian in western cuisine even though western stocks are also well known for their organoleptic properties that are exploited in many culinary applications.

While umami is well known and has been studied for a long time, xian remains less well defined in particular on a molecular level. However, Xian is a taste descriptor well understood and frequently used in Chinese culinary food culture, difficult to translate directly into Western languages. The direct translation of the two written characters which make up the word Xian is fish and goat, which indicates the complexity of the sensory experience. Like glutamate and umami, Xian components also enhance other flavours. Traditional Chinese high stocks, added to many different regional dishes to enhance flavour, are very high in Xian. Comparing Xian to glutamate or umami taste, Xian is far more complex, rounded and "comfortable", i.e. delicious, gratifying, agreeable. It is not uni-directional.

Many taste and flavor enhancers are available and are mainly based on chemical mixes based on MSG and other tasty and aromatic compounds. However, these compositions are not always satisfactory for premium applications since the global feeling is still chemical and does not reflect the authenticity of stocks and preparation that are homemade, whatever origin they have, whether Asian or Western. On the other hand, consumer are not willing to spend time in long time cooking of culinary stocks in to get the rich basis for meal application and it remains a need for a culinary base useful as ingredient or flavour enhancer, that is shelf stable and ready to use with convenience and that is also shelfstable.

It is therefore an object of the present invention to provide a shelf stable food composition that is useful to provide easily and conveniently the deliciousness to food preparations without the inconvenient of chemical aftertaste of existing products. The basic idea sustaining the present invention is to provide a food composition that can be in any shelfstable and/or concentrated form and that may be used for seasoning meals and any type of savoury meals. Above the simple seasoning action, the food composition according to the present invention should also be usable for enhancing the taste in this fifth dimension whatever it is called, XIAN, deliciousness, fullbodyness or any other wording.

The present invention concerns a shelf-stable cooking aid comprising
 a reduced amount of MSG, IMP (Inosine Monophosphate) and GMP (Guanosine Monophosphate),
 between 10 and 20% in weight of food derived acids and sugars and
 between 20 and 45% of macromolecules.

In one embodiment, all the components of the cooking aid can be of non natural origin, for example said cooking aid can be prepared by dry mixing.

According to a preferred embodiment of the invention, all the above mentioned components (MSG, IMP, GMP, the food derived acids, the sugars and the macromolecules) are of natural origin, present because of the raw products used in the process.

It is possible according to the invention to have a meat version, a vegetarian version or a combination thereof. All the percentages given below are valid for all the 3 versions, unless specified on the contrary. They are in weight, based on the dry matter.

By reduced amount of MSG, IMP and GMP we understand, that compared with existing products, the content is at least twice lower. Under macromolecules, we understand polysaccharides, proteins and fats.

Another important feature of the invention is that MSG, IMP and GMP are of natural origin. For determining the natural origin of these different components of the composition different techniques are possible. The most commonly used procedure is based on the isotopic 13C/12C ratio. For instance monosodium glutamate isolated from the product can be analysed using a Roboprep analyser coupled to a Europa 20-20 isotope ratio mass spectrometer which will chemically decompose MSG and the CO2 13C/12C isotope ratio is determined. In the case of a non natural MSG the 13C/12C isotope ratio will be lower than the for the natural one. The details concerning this type of measure is known from the man skilled in the art: see for example some details in Food Chemistry, Belitz-Grosch, Second Edition, pages 797-799, Abundance Ratios of Isotopes.

The reduced amount of MSG is a feature of the product of the invention, as well as the high amount of food derived acids. The food derived acids are taken from the group consisting of organic acids, amino acids and dipeptides. All the percentages in the present specification are given in weight.

The amino acids and dipeptides are mainly lysine, carnosine, asparagin, alanine, glutamine, phenylalanine, aspartic acid, ornithine with a minimum for glutamic acid. The organic acids are mainly lactic acid, citric acid, acetic acid and malic acid. For the vegetarian version, carnosine is not present.

As said before, the amount of MSG is reduced and is present in an amount of between 1 and 2%. Furthermore, the MSG is not an added MSG, but natural MSG, present on the base of the way of obtaining the cooking aid. The amount of IMP and GMP is comprised between 0.05 and 0.1%.

NaCl is also present in the cooking aid according to the invention. The salt can be present naturally or can be also added, depending on the type of process and on the version concerned. The amount of salt can vary broadly.

The cooking aid further comprises between 8 and 20% of polysaccharides. These polysaccharides are taken from the group consisting of derived cellulose, pectin, locust bean gum, starch, alone or in combination, for the vegetarian version, the polysaccharide content is higher than for the meat version.

The shelf-stable cooking aid comprises further 8 to 20% of proteins. These protein are taken in the group consisting of collagen, gelatin, myosin, actin, alone or in combination. Gelatin, myosin and actin are more specific for the meat version.

Finally, the cooking aid contains further at least one carbohydrate selected from the group consisting of glucose, fructose, mannose, sorbitol, glycerol alone or in combination. For the vegetarian version, the sugar content is normally higher than for the meat version.

For the meat version, an important feature of the invention is the structure of the product in aqueous phase, which is totally different from the structure of an existing product on the market, as it can be better considered in relation with the below included drawings. As already mentioned above, the second important feature of the product according to the invention is the organoleptic characteristics.

Another feature of the invention in the meat version is the low amount of fat, which is comprised between 0.2 and 15%. More particularly, the cooking aid has a free fatty acid content comprised between 1.9 and 3.2%.

Different forms of presentation can be considered for the shelf-stable cooking aid according to the invention. It is possible to have the composition in any physical form, like cube, powder, paste, concentrate, granule or liquid.

The present invention concerns further the use of a shelf stable concentrate cooking aid as described above, wherein the aid is comprised in culinary products taken from the group consisting of bouillons, sauces, dehydrated soups, liquid seasonings, snacks, prepared meals (chilled or frozen) in an amount comprised between 0.001 and 50% based on the total weight of said product.

The invention concerns further a process for the preparation of a shelf-stable cooking aid as described above, comprising the steps of milling the vegetables and/or the meat in mixture or separately,
blanching the vegetables,
hydrolysing the vegetables and/or the meat in mixture or separately,
stopping the hydrolysis and
concentrating.
Preparation of Stocks According to the Invention
Size reduction
Vegetables and meat are chopped or minced in a conventional apparatus
blanching
Vegetables are water or steam blanched
hydrolysing process
Meat and vegetables are enzymatically hydrolysed separately. The way of hydrolysing is according to the technique. The enzymes used are for example in the case of meat, proteases and in the case of vegetables, carbohydrases, for example cellulases
stopping the hydrolysis.
The hydrolysis is stopped by inactivation of enzymes with temperature increase.
concentration
The resulting vegetables or meat hydrolysate is concentrated by evaporation.

According to the invention, it is either possible to proceed with only vegetables, or only with meat or with both vegetables and meat. In the last case, the process is carried out with meat and separately with vegetables: the concentration is done and finally the dry powders are mixed together.

Concerning the type of meat to be used there is no criticality: it is possible to use pork, veal, beef, lamb, chicken, duck and every other type of meat. It is also possible to use fish: in this case, every type of fish is possible. Sea food is included in the fish definition.

Concerning the vegetables, there is also no criticality every type of vegetable can be used, like Europe type of vegetables or Chinese type of vegetables. For example, we can use carrots, tomato, bamboo, mushrooms, radish, celery, asparagus, cabbage, onion, soybeansprout.

According to a first embodiment of the process, after the end of the hydrolysis, the mixture is concentrated to form cubes or a paste. According to a second embodiment, after the end of the hydrolysis, the mixture is concentrated and dried into a powder or granule.

Organoleptic Analysis of the Stocks Prepared According to the Invention.

The typical Xian organoleptic descriptors for deliciousness according to trained panel have been identified and listed as follows:
  Fast Diffusion: corresponds to the first feeling that the consumer feels all over the mouth,
  Full Body: correspond to a well-balanced, appropriate levels of all flavour notes that result in a favourable, complete, mouth feeling sensation,
  Smoothness: correspond to a smooth coating on the tongue,
  Salivation this correspond to the intensity of salivation that the product generates just after consumption
  Retention: this is the post-consumption feeling that the product leaves in the mouth.

These five descriptors have been identified and are used to characterized and to hierarchise the different products made with the different ingredients used in different concentration.

It is noticeable that many descriptors refers to organoleptic features that are in relation not only with the any taste but are related to a textural effect. For example retention refer a possible long interaction of the components of the stocks with the mouth mucus and epithelium on the tongue, where taste buds are located. So, one can notice that the deliciousness in the sense it is understood in the context of the present invention refers to a sensitive feeling that goes beyond the taste itself. The deliciousness may then be qualified as an interaction of taste with an occupation of the interior of the mouth thanks to an important or at least non-neglictible textural effect.

There are different ways to use the cooking aid according to the invention. In the case of cubes, a paste or a powder, it is possible to add the cooking aid on the meal or in the meal, in a quantity depending on the taste wanted by the consumer. Normally, the cooking aid is added or mixed with the meal in a quantity of from 0.001 to 10% based on the total weight of the meal.

According to another feature, the invention concerns a method of providing conveniently Xian characteristics to foods by a natural ready-to-use cooking aid comprising
  a reduced amount of natural MSG, IMP and GMP
    between 10 and 20% in weight of natural food derived acids and sugars and
    between 20 and 45% of naturally derived macromolecules.

Figure 2:

The appended drawings illustrate the meat version structure of the cooking aid of the invention, wherein
FIG. 1 represents a microscopical view of an existing product.
FIG. 2 represents a microscopical view of the cooking aid of the invention meat version The goal of the microscopy work was to compare the structure of a product on the market (FIG. 1) with a cooking aid according to the invention (FIG. 2). The specimen were stored at 50° C. and were examined at 35° C. by wide filed epi-fluorescence microscopy after staining of the fat phase by an aqueous solution of Nile red. 50 µl of the stained specimen was laid onto a glass slide heated at 35° C. and covered with a 22 mm diameter glass cover slip and visualised. The scale on the figures is of 150 µm.

On FIG. 1, the fat globules are apparent. On the contrary, on FIG. 2, for the product of the invention, there are coacervates composed of a mixture of fat, protein and polysaccharide particles.

The following examples illustrate the invention in more details.

EXAMPLE 1

According to the invention, 1 kg of mushroom and 1 kg of ham are separately chopped and minced, respectively. The mushrooms are blanched and 9 kg of water, 10 g of cellulase and 10 g of protease are added to these mushrooms and hydrolysed at a temperature of 50-60° C. during 4 to 6 hours. The minced meat is also hydrolysed with 9 kg of water and 5 g of protease at a temperature of 60 C during 24 hours. By the end of the hydrolysis, the temperature is increased for meat and mushrooms hydrolysates to inactivate said enzymes. Both hydrolysates are concentrated by evaporation and vacuum drying to moisture of less than 5%: both powders are mixed together.

EXAMPLE 2

According to the invention, 1 kg of mushroom and 1 kg of bamboo shoots are separately chopped. The mushrooms and the bamboo shoots are blanched separately. Then, 9 of water, 10 g of cellulose and 10 g of protease are added to these mushrooms and hydrolysed at a temperature of 5060° C. during 4 to 6 hours. The bamboo shoots are also hydrolysed with 9 kg of water, 10 g of cellulase and 10 g of protease at the same temperature and duration as for the mushrooms. By the end of the hydrolysis, the temperature is increased for bamboo shoots and mushrooms hydrolysates to inactivate said enzymes. Both hydrolysates are concentrated by evaporation and vacuum drying to moisture of less than 5%: both powders are mixed together.

EXAMPLE 3

The product according to example 1 is added into a dehydrated chicken bouillon at a level of 10%. After reconstitution in hot water, the consumer has the perception of the five above mentioned Xian descriptors.

The invention claimed is:
1. A shelf-stable concentrate cooking aid comprising:
  a meat hydrolysate comprising:
    MSG in an amount from about 1.0% to about 2.0% by weight;
    IMP in an amount from about 0.05% to about 0.1%;
    GMP in an amount from about 0.05% to about 0.1%;
    sodium chloride;
    between 10 and 20% by weight of food derived acids; and
    between 20 and 45% by weight macromolecules comprising proteins and fats, the proteins are present in an amount from about 8% to about 20%, and the MSG, the IMP, the GMP, the food derived acids, the macromolecules are provided by a raw meat product used to produce the meat hydrolysate.
2. The shelf-stable concentrate cooking aid of claim 1, wherein the shelf-stable concentrate cooking aid is in a form selected from the group consisting of cube, powder, granule, liquid, and combinations thereof.

3. The shelf-stable concentrate cooking aid of claim 1, wherein the food derived acids are natural food derived acids selected from the group consisting of organic acids, amino acids, dipeptides, and combinations thereof.

4. The shelf-stable concentrate cooking aid of claim 3, wherein the amino acids and dipeptides are selected from the group consisting of lysine, carnosine, asparagine, alanine, glutamine, phenylalanine, aspartic acid, ornithine, glutamic acid, and combinations thereof.

5. The shelf-stable concentrate cooking aid of claim 3, wherein the organic acids are selected from the group consisting of lactic acid, citric acid, acetic acid, malic acid, and combinations thereof.

6. The shelf-stable concentrate cooking aid of claim 1, wherein the proteins are selected from the group consisting of collagen, gelatin, myosin, actin, and combinations thereof.

7. The shelf-stable concentrate cooking aid of claim 1, wherein the shelf-stable concentrate cooking aid has a structure in an aqueous phase with molecular aggregates comprising coacervates formed by the proteins and the fats having inclusion of aqueous phase.

8. The shelf-stable concentrate cooking aid of claim 1, wherein the amount of the fats is between 0.2 and 15%.

9. The shelf-stable concentrate cooking aid of claim 1, wherein the shelf-stable concentrate cooking aid has a free fatty acid content between 1.9 and 3.2%.

10. The shelf-stable concentrate cooking aid of claim 1, wherein the sodium chloride is provided by the raw meat product used to produce the shelf-stable concentrate cooking aid.

11. A method comprising adding a shelf-stable concentrate cooking aid to a culinary product, the shelf-stable concentrate cooking aid comprising a meat hydrolysate having sodium chloride, MSG in an amount from about 1.0% to about 2.0% by weight, IMP in an amount from about 0.05% to about 0.1%, GMP in an amount from about 0.05% to about 0.1%; between 10 and 20% by weight of food derived acids; and between 20 and 45% by weight macromolecules comprising proteins and fats, the culinary product selected from the group consisting of bouillons, sauces, dehydrated soups, and liquid seasonings in an amount comprised between 0.001 and 50% based on the total weight of the culinary product, the proteins are present in the shelf-stable concentrate cooking aid in an amount from about 8% to about 20%, and the MSG, the IMP, the GMP, the food derived acids and the macromolecules are provided by a raw meat product used to produce the meat hydrolysate.

12. A process for the preparation of a shelf-stable cooking aid, the process comprising:
    milling;
    enzymatically hydrolyzing the meat with enzymes to form a meat hydrolysate;
    stopping the hydrolysis by inactivating the enzymes with a temperature increase and
    concentrating the meat hydrolysate to at least partially form the shelf-stable cooking aid, the shelf-stable cooking aid comprising sodium chloride, MSG in an amount from about 1.0% to about 2.0% by weight, IMP in an amount from about 0.05% to about 0.1%, GMP in an amount from about 0.05% to about 0.1%, between 10 and 20% by weight of food derived acids, and between 20 and 45% by weight macromolecules comprising proteins and fats, the proteins are present in an amount from about 8% to about 20%, and the MSG, the IMP, the GMP, the food derived acids and the macromolecules in the shelf-stable cooking aid are provided by the meat.

13. The process of claim 12, wherein after the hydrolysis, the mixture is dried into any physical form.

14. A process for preparing a product comprising a shelf-stable concentrate cooking aid, the process comprising:
    forming the shelf-stable concentrate cooking aid by mixing sodium chloride, MSG in an amount from about 1.0% to about 2.0% by weight, IMP in an amount from about 0.05% to about 0.1%, GMP in an amount from about 0.05% to about 0.1%, between 10 and 20% by weight of food derived acids, and between 20 and 45% by weight macromolecules comprising proteins and fats, the MSG, the IMP, the GMP, the food derived acids and the macromolecules are provided by a raw meat product used to produce the meat hydrolysate, the proteins are present in the shelf-stable concentrate cooking aid in an amount from about 8% to about 20%; and
    combining the shelf-stable concentrate cooking aid with additional ingredients to form the product.

15. A method for imparting and/or enhancing taste in a meal comprising adding a natural cooking aid comprising a meat hydrolysate having sodium chloride, MSG in an amount from about 1.0% to about 2.0% by weight, IMP in an amount from about 0.05% to about 0.1%, GMP in an amount from about 0.05% to about 0.1%, between 10 and 20% by weight of food derived acids, and between 20 and 45% by weight macromolecules comprising proteins and fats, the MSG, the IMP, the GMP, the food derived acids and the macromolecules are provided by a raw meat product used to produce the meat hydrolysate, to a meal in a quantity of from 0.001 to 10% based on a total weight of the meal, the proteins are present in the natural cooking aid in an amount from about 8% to about 20%.

16. A method of conveniently providing a desired characteristic to a food by a natural ready-to-use cooking aid comprising a meat hydrolysate, the method comprising:
    mixing sodium chloride, MSG in an amount from about 1.0% to about 2.0% by weight, IMP in an amount from about 0.05% to about 0.1%, GMP in an amount from about 0.05% to about 0.1%, between 10 and 20% in weight of natural food derived acids, and between 20 and 45% of naturally derived macromolecules comprising proteins and fats, to form the natural ready-to-use cooking aid, the proteins are present in an amount from about 8% to about 20%, and the MSG, the IMP, the GMP, the food derived acids and the macromolecules are provided by a raw meat product used to produce the meat hydrolysate; and
    adding the natural ready-to-use cooking aid to the food.

17. The method of claim 11, wherein the raw meat product is selected from the group consisting of pork, veal, beef, lamb, chicken, duck, and combinations thereof.

* * * * *